（12） United States Patent
Arakawa (10) Patent No.: US 7,925,396 B2
(45) Date of Patent: Apr. 12, 2011

(54) MOBILE OBJECT MONITORING DEVICE (75) Inventor: Shuuji Arakawa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 380 days.

(21) Appl. No.: 12/225,476

(22) PCT Filed: Mar. 26, 2007

(86) PCT No.: PCT/JP2007/056258
§ 371 (c)(1),
(2), (4) Date: Sep. 23, 2008

(87) PCT Pub. No.: WO2007/111315
PCT Pub. Date: Oct. 4, 2007

(65) Prior Publication Data
US 2009/0118895 A1 May 7, 2009

(30) Foreign Application Priority Data

Mar. 28, 2006 (JP) ................................. 2006-088335

(51) Int. Cl.
*G06F 7/00* (2006.01)
(52) U.S. Cl. ................ 701/29; 701/30; 701/33; 701/36; 701/50; 340/539.1
(58) Field of Classification Search ............ 701/29, 701/36, 50, 112, 54, 24, 30, 33; 340/539.1
See application file for complete search history.

(56) References Cited

U.S. PATENT DOCUMENTS

| 7,183,666 | B2 * | 2/2007 | Arakawa et al. ............ 307/10.2 |
| 7,502,687 | B2 * | 3/2009 | Flick ............................. 701/213 |
| 7,762,787 | B2 * | 7/2010 | Kawakami et al. ............ 417/34 |
| 2004/0210371 | A1 | 10/2004 | Adachi et al. |
| 2005/0149244 | A1 * | 7/2005 | Matsuda ......................... 701/50 |
| 2006/0200292 | A1 * | 9/2006 | Asakage ......................... 701/50 |
| 2007/0139017 | A1 * | 6/2007 | Marchand et al. ............ 320/150 |

FOREIGN PATENT DOCUMENTS

| JP | 2000-276681 | 10/2000 |
| JP | 2002-290596 | 10/2002 |
| JP | 2003-027528 | 1/2003 |
| JP | 2003-193519 | 7/2003 |

OTHER PUBLICATIONS

International Search Report mailed May 1, 2007, issued on PCT/JP2007/056258.

* cited by examiner

*Primary Examiner* — Thomas G Black
*Assistant Examiner* — Marthe Marc Coleman
(74) *Attorney, Agent, or Firm* — Edwards Angell Palmer & Dodge LLP (57) ABSTRACT The present invention reduces power consumption as much as possible when an engine is off state. A mobile object monitoring device 40, which is installed in a mobile object 10 with an engine 11 as a drive source, includes a monitoring control unit 41 that collects information about the mobile object 10, and a work control unit 42 that controls work of the monitoring control unit 41. The work control unit 42 activates the monitoring control unit 41 according to an intermittent work schedule S3 in which an operation rate is gradually decreases until a continuous working time of the engine 11 exceeds a predetermined threshold W0 after the engine 11 becomes off state.

8 Claims, 6 Drawing Sheets

MOBILE OBJECT MONITORING DEVICE

TECHNICAL FIELD

The present invention relates to a mobile object monitoring device which remotely monitors a mobile object such as construction machine.

BACKGROUND ART

In the past, a mobile object monitoring system is provided to monitor a mobile object such as construction machine. This type of the mobile object monitoring system is equipped with a mobile object monitoring device mounted on a target mobile object to collect and send information about the mobile object, such as position, battery voltage, and fuel level, to a control unit.

According to the mobile object monitoring system, even the mobile object is positioned in a remote working area, the control unit is able to keep track of conditions of the mobile object such as operational statuses and judgment of maintenance necessities, based on the information received by the control unit. Accordingly, the mobile object is quickly treated even if a problem is found in the mobile object.

Usually, a collection process of information by the above mentioned mobile object monitoring device is continued while an engine is not running. However, if the mobile object monitoring device continues the collection process at a same operation rate when the engine is not running, a battery is subjected to a large load, thereby causing such problem that the engine is not restarted after the engine is turned off for a long time.

Therefore, a system which prolongs a battery life by reducing the operation rate of the information collection process of the mobile object monitoring device when the engine is off state for a predetermined period is provided in the past. According to this conventional technique, the battery load is reduced as much as possible, since the operation rate of the information collection process of the mobile object monitoring device is reduced, that is, a resting time of the mobile object monitoring device is increased, when the engine is off state for a long term. Accordingly, a capacity of restarting the engine is secured even thought the engine is off state, and a continuous monitoring of the mobile object is allowed (for example, see Patent Document 1).

Patent Document 1: Japanese Patent Application Laid-Open No. 2003-27528

DISCLOSURE OF INVENTION

Problem to be Solved by the Invention

Meanwhile, there are many scenes that the engine is on state for a short time (hereafter, referred to as short period operation) in actual operation of the mobile object. For example, the engine is on state within five minutes in most cases of changing parking positions of a construction machine in work site and changing postures of the working machine.

Here, the battery load is surged by driving a starter to start the engine. However, a battery charge by an alternator is not completed for only five minutes of engine running. Therefore, according to the prior art which determines an operation rate of information collection process of a mobile object monitoring device based on a time period of engine off state, a battery load surged by prosecuting the information collection of the mobile object monitoring device at a high operation rate in addition to the power consumption for driving the starter when taken a short period operation after an engine off state is continued.

The present invention is made in view of the above problems and an object of the present invention is to provide a mobile object monitoring system which reduces power consumption as much as possible when an engine is off state.

Means for Solving Problem

According to an aspect of the present invention, a mobile object monitoring device, which is installed in a mobile object with an engine as a drive source, includes a monitoring control unit that collects information about the mobile object and a work control unit that controls work of the monitoring control unit. The work control unit activates the monitoring control unit according to an intermittent work schedule in which an operation rate is gradually decreases until a continuous working time of the engine exceeds a predetermined threshold after the engine becomes off state.

Further, in the mobile object monitoring device, the mobile object may include a battery which is charged when the engine is on state. The work control unit may control the monitoring control unit with the threshold which is a time required to charge the battery to a certain charge level by driving the engine.

Further, in the mobile object monitoring device, the work control unit may activate the monitoring control unit according to a high operation work schedule which has a higher operation rate than the intermittent work schedule if a predetermined intermittent condition is met.

Further, in the mobile object monitoring device, the monitoring control unit may include a function to collect positional information of the mobile object. The work control unit may activate the monitoring control unit according to the high operation work schedule when the work control unit determines that the intermittent condition is met if a traveling distance of the mobile object, which is computed using the positional information collected by the monitoring control unit, exceeds a predetermined reference distance.

Further, in the mobile object monitoring device, the work control unit may activate the monitoring control unit according to a high operation work schedule which has a higher operation rate than the intermittent work schedule if the engine becomes on state during activation of the monitoring control unit according to the intermittent work schedule.

Further, in the mobile object monitoring device, in case that the high operation work schedule is prosecuted by sustaining the intermittent work schedule, the work control unit may restart thereafter activation of the monitoring control unit according to the intermittent work schedule if the continuous working time of the engine in the meantime does not exceed the threshold.

Further, in the mobile object monitoring device, the intermittent work schedule may reduce the operation rate of the monitoring control unit in a phased manner according to an accumulated time for the engine in off state and eventually deactivates the monitoring control unit.

Further, in the mobile object monitoring device, the monitoring control unit may include a communication processing unit, which transmits the information about the mobile object to a management unit which administrates the mobile object if a predetermined transmission condition is met.

Effect of the Invention

According to the present invention, a resting time of the monitoring control unit is not shortened until the accumulated time for the continued working time of the engine exceeds the predetermined threshold after the engine is off state. Accordingly, the resting time of the monitoring control unit is maintained when the engine of the mobile object is operated for a short time, and the power consumption can be reduced as much as possible when the engine is off state.

DESCRIPTION OF THE NUMERALS

10 Construction machine
11 Engine
12 Working machine
13 Operation input unit
14 Engine control unit
15 Working control unit
16 Alternator
17 Battery
18 Fuel gauge
20 GPS sensor
21 Antenna
30 Transceiver
31 Antenna
40 Mobile object monitoring device
41 Monitoring control unit
41a Monitoring information collection unit
41b Communication processing unit
42 Work control unit
42a Work determination unit
42b Timer
43 Memory unit
50 Ground station
60 Management unit
CS Communication satellite
GS GPS satellite
N Network

BEST MODE FOR CARRYING OUT THE INVENTION

Referring to attached figures, exemplary embodiments of a mobile object monitoring device according to the present invention are described below.

Figure 1:
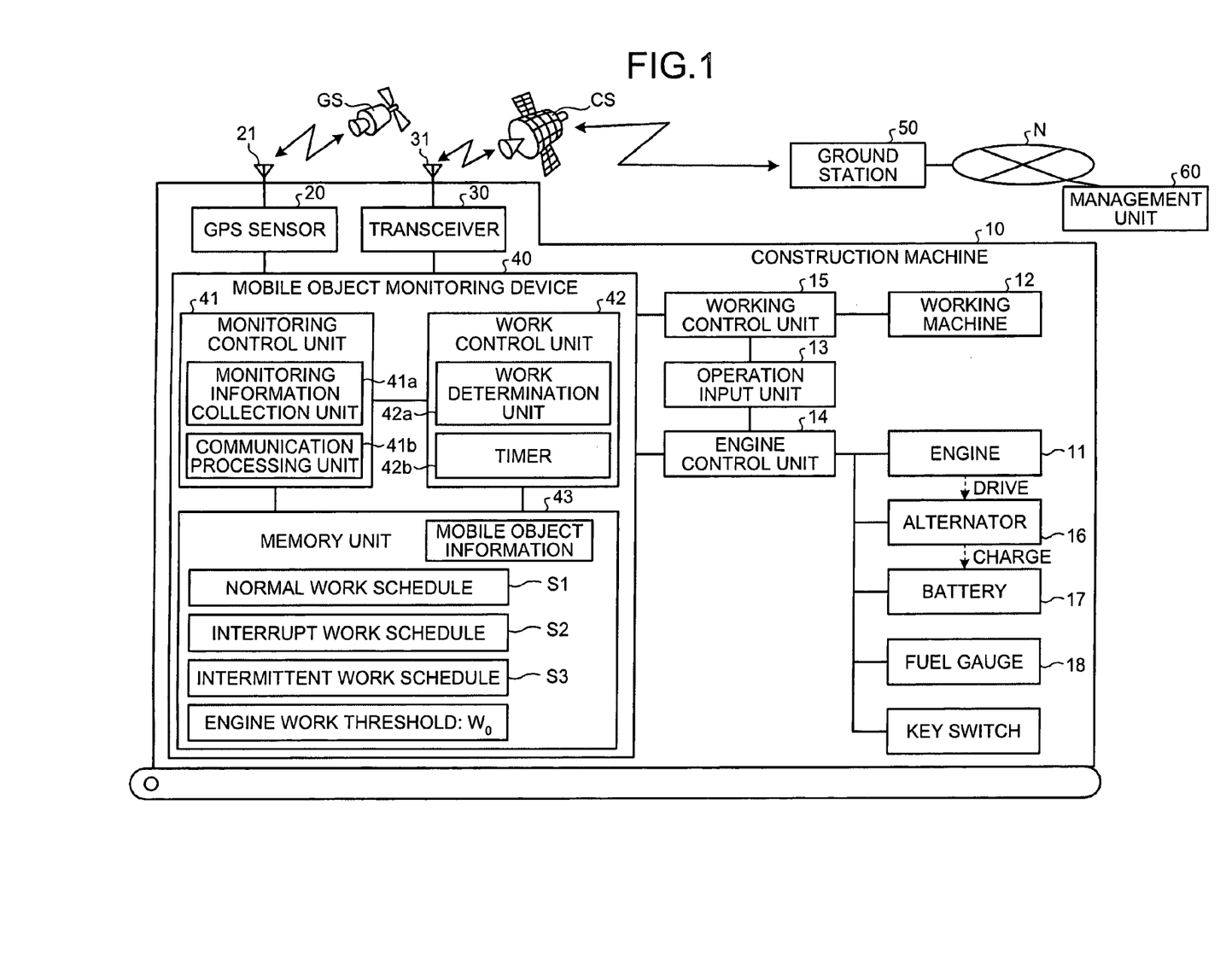
FIG. 1 is a schematic diagram showing a configuration of a mobile object monitoring system including a mobile object monitoring device according to a embodiment of the present invention.
Figure 2:
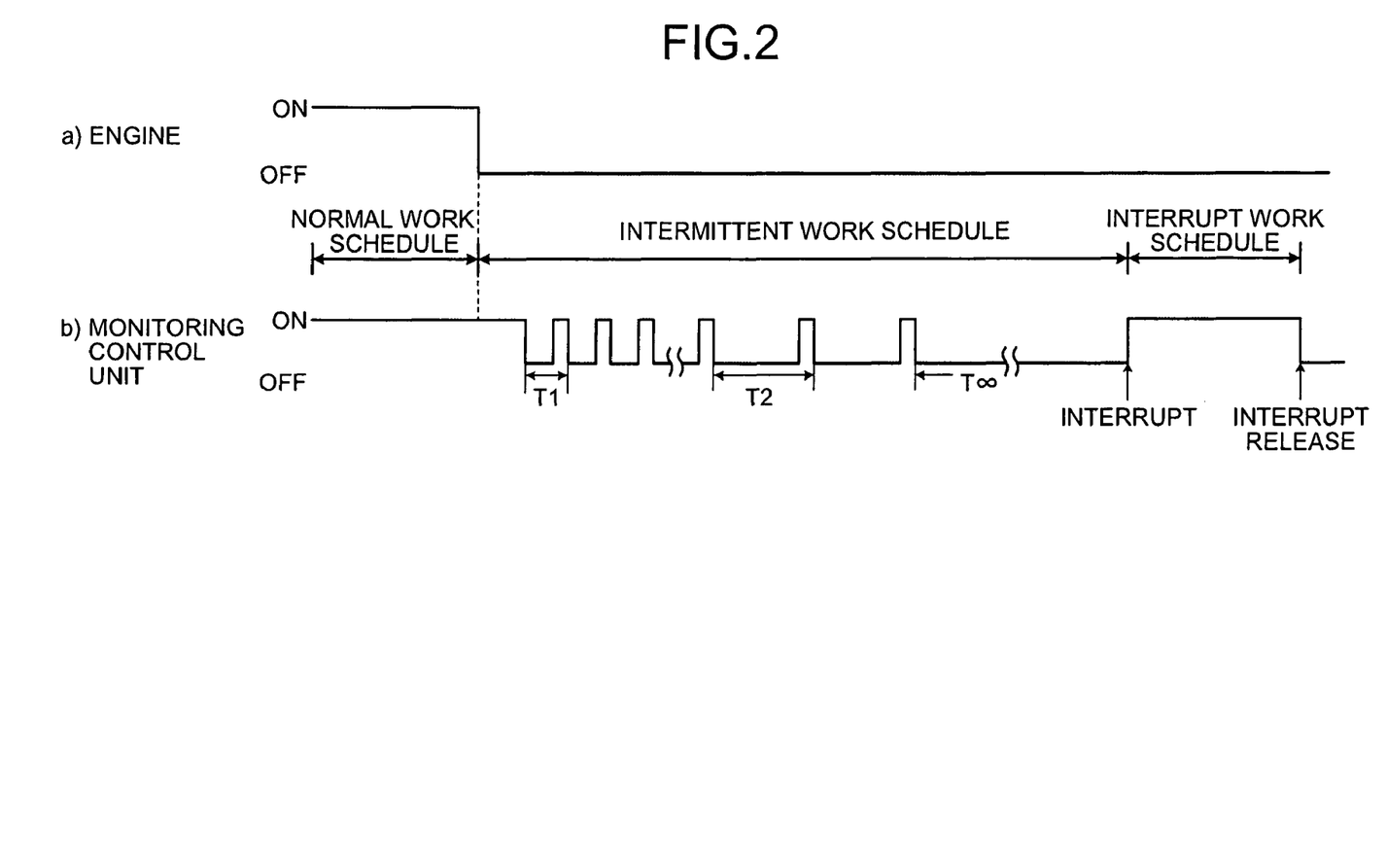
FIG. 2 is a timing chart showing a relationship between an working state of an engine and a control of a monitoring control unit which is processed by an work control unit shown in FIG. 1.

FIG. 1 exemplifies a schematic configuration of a mobile object monitoring system including a mobile object monitoring device according to an embodiment of the present invention, and illustrates a monitoring system for monitoring a construction machine. The construction machine 10 which is a target of monitor includes an engine 11 as a drive source, and a working machine 12 such as a bucket. In this construction machine 10, a work of the engine 11 is controlled by an engine control unit 14 when a drive command is given via an operation input unit 13, and a work of the working machine 12 is controlled by a working control unit 15, thereby being capable of a desired construction work at a work site. The construction machine 10 charges a battery 17 which is a power source of the construction machine 10 by driving an alternator 16 associated with the engine 11 when the engine 11 is on state.

The construction machine 10 is equipped with a GPA sensor 20, a transceiver 30, and a mobile object monitoring device 40. The GPA sensor 20 obtains information from a plurality of GPS satellites GS via an antenna 21, and detects a self location information using the obtained information. The transceiver 30 establishes a communication connection with a management unit 60 via a network N such as an antenna 31, a communication satellite CS, a ground station 50, and internet to prosecute a transmitting and receiving processes between the management unit 60 and the mobile object monitoring device 40 described below.

The mobile object monitoring device 40 makes up a mobile object monitoring system between the management unit 60 and the mobile object monitoring device 40, and includes a monitoring control unit 41, a work control unit 42, and a memory unit 43.

A main function of the monitoring control unit 41 is to collect information about the construction machine 10, and includes a monitoring information collection unit 41a and a communication processing unit 41b. The monitoring information collection unit 41a collects pre-set information when a monitoring command is given, and stores the collected information as "mobile object information" into the memory unit 43. According to this embodiment, the monitoring information collection unit 41a collects information on a working state of the construction machine 10 via the engine control unit 14 and the working control unit 15 when the monitoring command is given, and collects position information of the construction machine 10 via GPS sensor 20. The information collected by the engine control unit 14 includes, for example, a working state of the alternator 16, a voltage of the battery 17, a remaining amount of fuel detected by a fuel gage 18 as well as a direct working state of the engine 11.

The monitoring information collection unit 41a sends the mobile object information stored in the memory unit 43 to the management unit 60 if a pre-set transmission condition is met. A example of the transmission condition are, for example, that the engine 11 is on state, or continued working time Wn of the engine 11 reaches a predetermined time. The transmission is processed arbitrarily based on the working state of the engine 11, the management unit 60 is able to recognize a condition of the construction machine 10 in operation. Also, the transmission can be made when the construction machine 10 is determined to have a trouble based on the information collected by the monitoring information collection unit 41a. Whether the construction machine 10 has the trouble or not is determined by the voltage of the battery 17, the remaining amount of fuel, or the position information of the construction machine 10. Since declines of the voltage of the battery 17 and the remaining amount of fuel are directly linked to the work of the construction machine 10, the declines of the voltage of the battery 17 and the remaining amount of fuel can be handled properly by sending the voltage of the battery 17 and the remaining amount of fuel to the management unit 60. With regard to the position information on the construction machine 10, if the construction machine 10 is deviated from a predetermined working area, the construction machine 10 may be robbed. Thus, this kind of trouble is properly handled by sending the position information on the construction machine 10 to the management unit 60.

The work control unit 42 controls a behavior of the monitoring control unit 41, and includes a work determination unit 42a and a timer 42b.

The work determination unit 42a determines the behavior of the monitoring control unit 41 based on the working state of the construction machine 10 such as the working state of the engine 11 obtained by the engine control unit 14, the working state of the working machine 12 obtained by the working control unit 15, the mobile object information stored in the memory unit 43. According to the embodiment, a plurality of working schedules is pre-set in the memory unit 43, and one out of the plurality of working schedules is selected based on the working state of the construction machine 10 to operate the monitoring control unit 41 in accordance with the selected working schedule. As work schedules, a normal work schedule S1, an interrupt work schedule S2, and an intermittent work schedule S3 are pre-set in the memory unit 43.

When the engine 11 of the construction machine 10 is on state, the work determination unit 42a selects the normal work schedule S1 to maintain the monitoring control unit 41 in constant operation, and to run the information collection processes of the construction machine 10 by giving the monitoring command to the monitoring information collection unit 41a at a relatively high operation rate with 1 to 2 minute intervals. Over this period, if the above mentioned condition is met, the mobile object information is sent to the management unit 60 by the communication processing unit 41b. The normal work schedule S1 ends when the engine 11 is turned off, while the monitoring control unit 41 keeps running until a predetermined post-processing time elapses.

When a predetermined interrupt condition is met, the work determination unit 42a selects the interrupt work schedule S2 to maintain the monitoring control unit 41 in constant operation as well as the normal work schedule S1, and to run the information collection processes of the construction machine 10 by giving the monitoring command to the monitoring information collection unit 41a at a relatively high operation rate with 1 to 2 minute intervals. The interrupt work schedule S2 is continued until an interrupt release condition is met. A example of the interrupt condition includes a condition that a traveling distance of the construction machine 10, which is calculated based on the position information collected by the monitoring control unit 41, exceeds a predetermined reference distance (for example, 1 km). On the other hand, an example of the interrupt release condition includes a condition that a traveling condition of the construction machine 10 falls below a predetermined condition (for example, 500 m/5 min). Over this period, if the above mentioned condition is met, the mobile object information is sent to the management unit 60 by the communication processing unit 41b as well as the normal work schedule S1.

Meanwhile, when the engine 11 is off state, the work determination unit 42a selects the intermittent work schedule S3 to intermittently activate the monitoring control unit 41 which prosecutes the information collection process of the construction machine 10. According to the embodiment, the intermittent work schedule S3 reduces the operation rate in a stepwise manner based on an accumulated time of the engine off state, and eventually stops running of the monitoring control unit 41. To be more precise, the intermittent work schedule S3 turns on a timer 42b when the engine 11 is turned off, and intermittently activates the monitoring control unit 41 with 8 minutes of resting time and 2 minutes of activation time in 10 minute periods T1 until the accumulated time reaches about 1 to 2 weeks. Thereafter, the intermittent work schedule S3 intermittently activates the monitoring control unit 41 with 28 minutes of resting time and 2 minutes of activation time in 30 minute periods T2, and eventually stops running of the monitoring control unit 41 (T∞) when the accumulated time reaches one month. Even though the engine 11 is off state, if the above mentioned condition is met while the monitoring control unit 41 is activated, the mobile object information is sent to the management unit 60 by the communication processing unit 41b. Whether the engine 11 is working or not is determined based on the generation voltage of the alternator 16 described above.

As mentioned above, even though the monitoring control unit 41 is running according to the intermittent work schedule S3, if the engine 11 is started or the interrupt condition is met, the monitoring control unit 41 is activated according to the normal work schedule S1 or the interrupt work schedule S2. When the monitoring control unit 41 is activated according to the normal work schedule S1 or the interrupt work schedule S2 during the activation according to the intermittent work schedule S3, the work control unit 42 determines a following work of the monitoring control unit 41 based on a continuous working time Wn of the engine 11 in the mean time. To be more specific, a threshold W0 is pre-set in the memory unit 43, and the following work of the monitoring control unit 41 is determined based on whether or not the engine 11 has kept running for more than the threshold W0. A example of the threshold W0 includes 40 to 60 minutes for a battery mounted on a normal construction machine 10 which corresponds to a time which the battery 17 needs to be charged at up to a predetermined charge level by working the engine 11.

Figure 3:
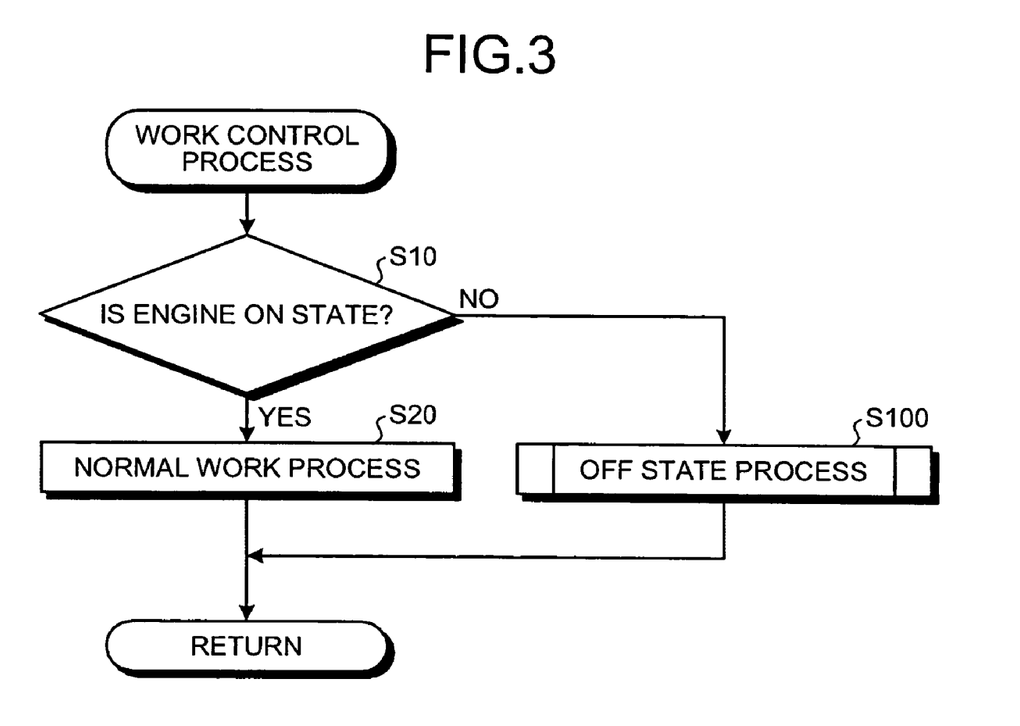
FIG. 3 is a flowchart showing a work control process prosecuted by the work control unit shown in FIG. 1.
Figure 4:
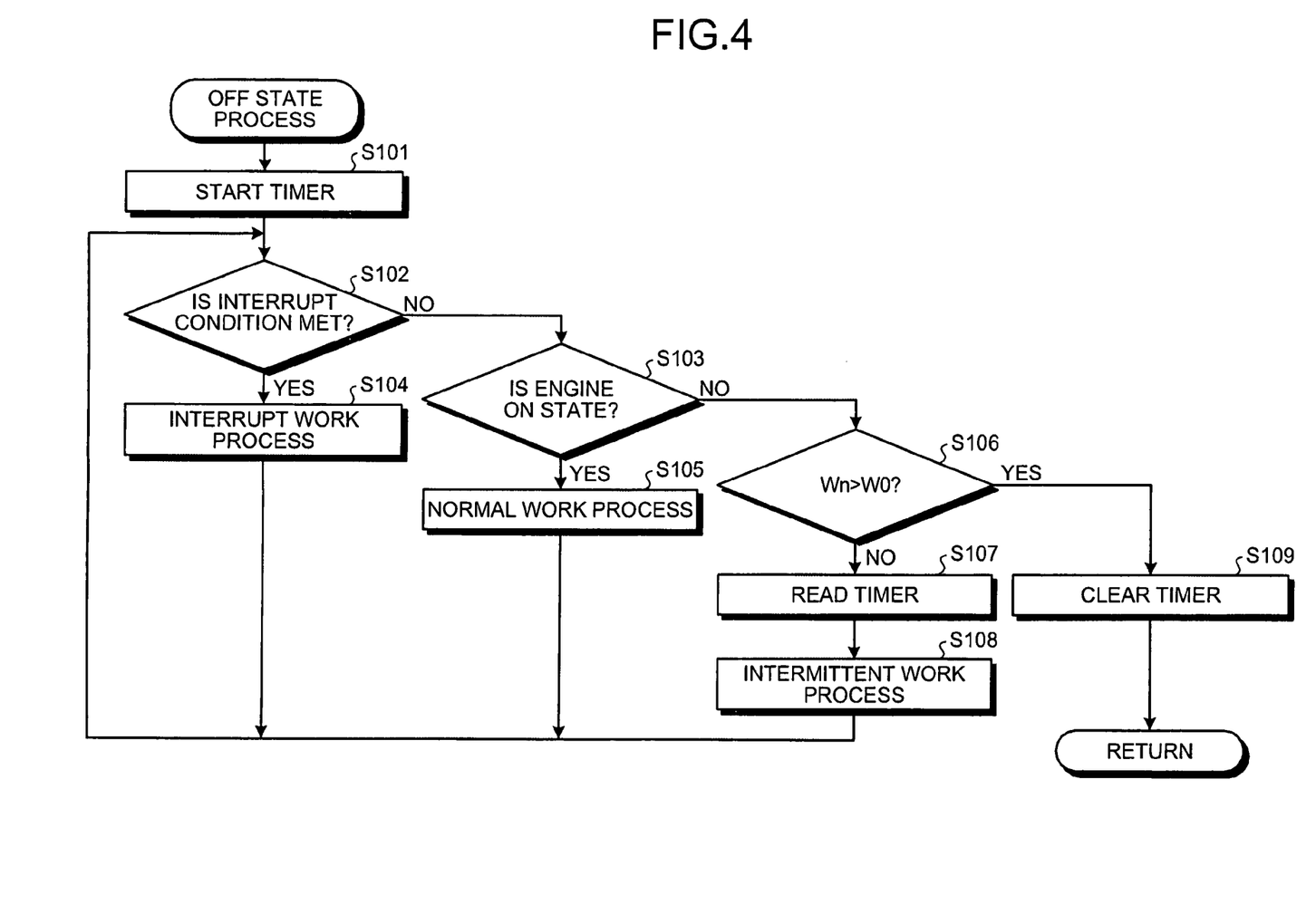
FIG. 4 is a flowchart explaining the off work process shown in FIG. 3.

FIGS. 3 and 4 are flowcharts showing work control process of the work control unit 42. Referring to these figures, we will explain the works of the work control unit 42 and more details of features of the present invention. In the work control process shown in FIG. 3, the work control unit 42 determines whether the engine 11 is on state or not (Step S10). If the engine 11 is on state (Step S10, Yes), the normal work process is prosecuted according to the normal work schedule S1 by selecting the normal work schedule S1 (Step S20). Accordingly, when the engine 11 is on state, the monitoring control unit 41 of the mobile object monitoring device 40 is maintained to be activated, and the monitoring information collection unit 41a prosecutes the information collection processes of the construction machine 10 at a relatively high operation rate with 1 to 2 minute intervals.

On the other hand, if the engine 11 is off state (Step S10, No), the work control unit 42 prosecutes off state processes (Step S100). In this off state processes, as shown in FIG. 4, the work control unit 42 begins timing for the accumulated time for off state of the engine 11 by turning on the timer 42b (Step S101). Thereafter, the work control unit 42 determines whether or not the interrupt condition is met, and whether or not the engine 11 is on state (Step S102 and Step S103).

If the interrupt condition is met (Step S102, Yes), the work control unit 42 prosecutes the interrupt work process based on the interrupt work schedule S2 by selecting the interrupt work schedule S2 (Step S104), and thereafter returns to Step S102. Accordingly, even though the engine 11 is off state, the interrupt work process is preferentially prosecuted if the interrupt condition is met. Therefore, if the traveling distance of the construction machine 10 increases when the engine 11 is off state, that is, a trouble that the construction machine 10 is robbed is happen at a high possibility, the position information of the construction machine 10 is obtained at a high operation rate with 1 to 2 minute intervals. Furthermore, because the obtained position information of the construction machine 10 is sent to the management unit 60 by the communication processing unit 41b, the management unit 60 can recognize and handle this situation even though the construction machine 10 is located in remote work area.

On the other hand, if the interrupt condition is not met or the interrupt condition is released while the engine 11 is on state at Step S102 (Step S102, No→Step S103, Yes), the work control unit 42 selects the normal work schedule S1 to prosecute the normal work process according to the normal work schedule S1 (Step S105). Accordingly, when the engine 11 restarts after once being off state, the monitoring control unit 41 of the mobile object monitoring device 40 is maintained to be activated all time, and the monitoring information collection unit 41a prosecutes the position information processes of the construction machine 10 with 1 to 2 minute intervals.

On the other hand, if the interrupt condition is not met and the engine 11 is off state (Step S102, No→Step S103, No), the work control unit 42 determines whether or not the continuous working time Wn of the engine 11 in the off state exceeds the predetermined threshold W0 (Step S106).

If the engine 11 is continuous off state on the off working process, or if the engine 11 is on state again and its working time Wn is around 5 minutes and less than the threshold W0 (Step S106, No), by reading the time of the timer 42b (Step S107) and selecting the intermittent work schedule S3, the routine executes the intermittent work schedule according to the intermittent work schedule S3 during this time (Step S108), then returns to Step S102. As a consequence, in manner of reducing the operation rate step by step according to the accumulated time of the engine 11 in off state, the monitoring control unit 41 is intermittently activated, thereby, allowing to reduce the load of the battery 17, and to continuously monitor the construction machine 10.

On the other hand, if the continuous working time Wn of the engine 11 exceeds the threshold W0 on off working process (Step S106, Yes), the timer 42b is cleared (Step S109), then the process is returned to the working control process. Accordingly, when the off working process is proceeded after the engine 11 is off state on Step S10 of the working control process, the timer 42b starts to time at that point of time, and the intermittent work process is proceeded again with the intermittent work of the construction machine 10 minute periods even though the monitoring control unit 41 is deactivated in the previous off working process.

The working control process and the off working process described above are iterated for following processes, and the construction machine 10 is maintained to be watched for a certain period even after the engine 11 become off state.

Here, according to the mobile object monitoring device 40, the accumulated time for off state of the engine 11, which acts as a criteria for prosecuting the intermittent work process on the off working process, depends on nether the interrupt work process nor the work of the engine 11 of which the continuous working time Wn falls below the threshold W0. That is, although the interrupt work process is preceded on the off work process, or although the normal work process is preceded, the timer 42b continues to time if the continuous working time Wn of the engine 11 falls below the threshold W0. The timer 42b is cleared for the first time when the continuous working time Wh of the engine 11 exceeds the threshold W0.

Figure 5:
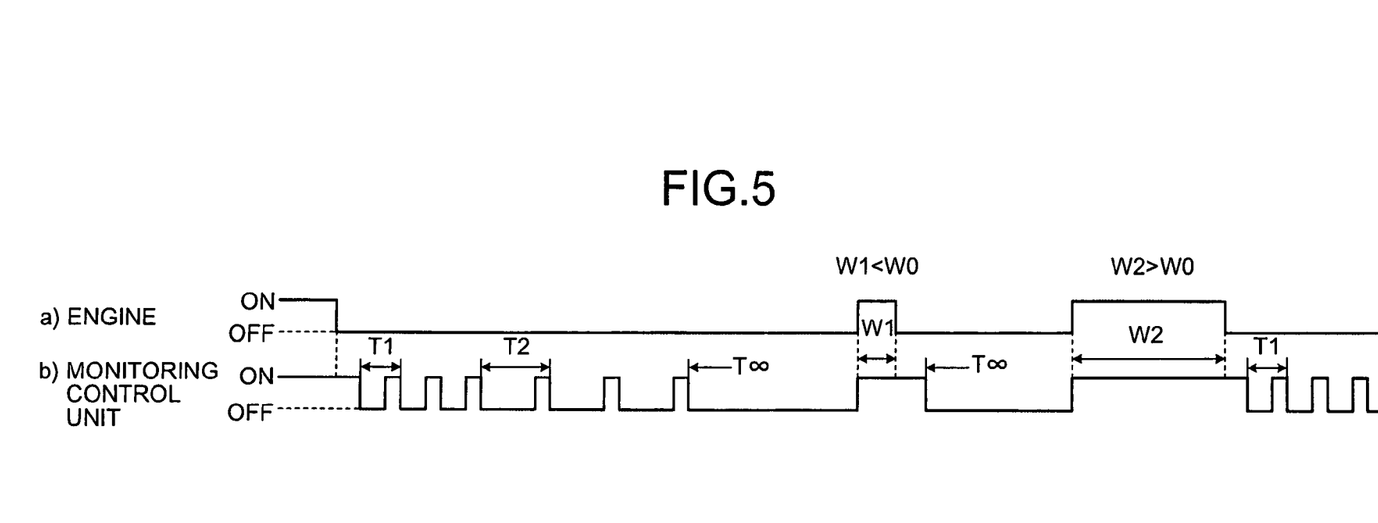
FIG. 5 is a timing chart showing a relationship between a working state of an engine and a control of a monitoring control unit which is processed in the work control unit shown in FIG. 1.
Figure 6:
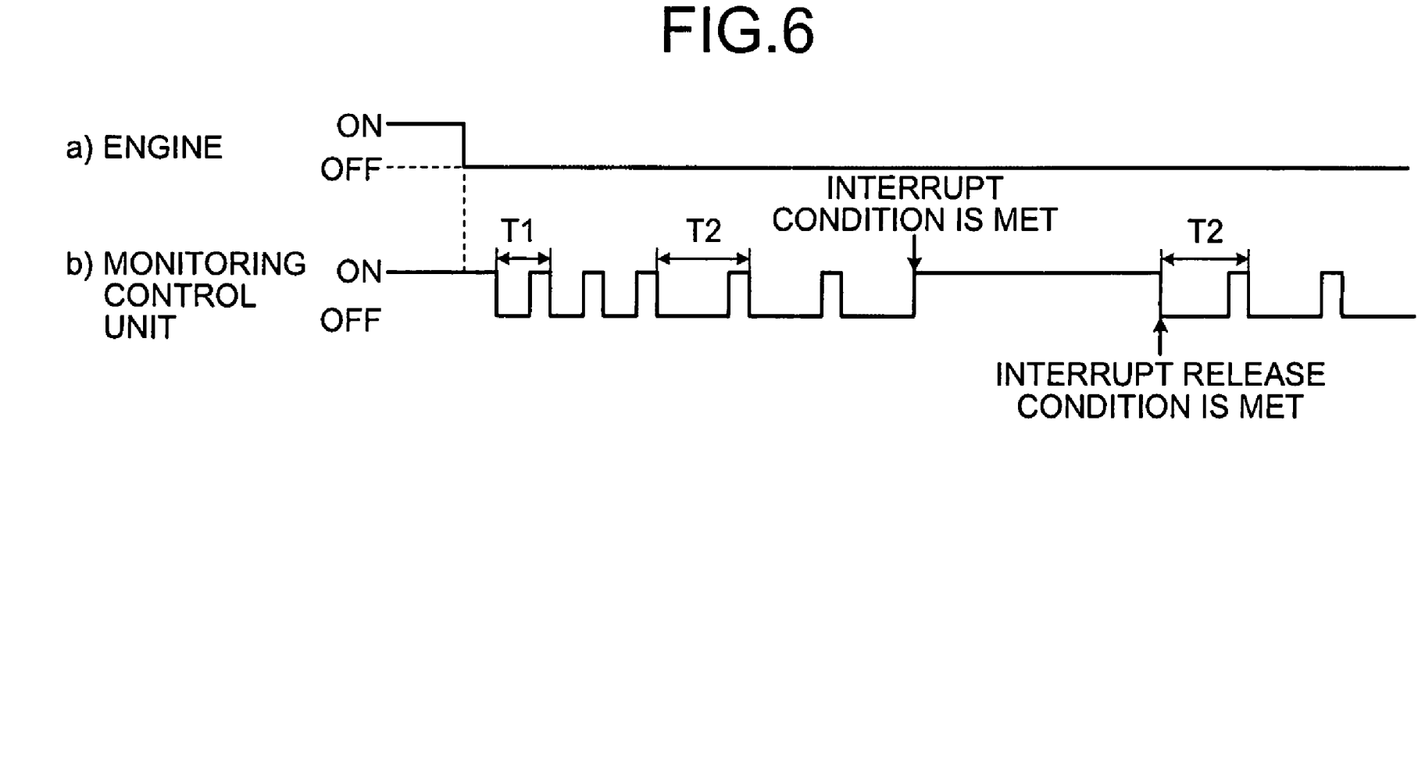
FIG. 6 is a timing chart showing a relationship between a working state of an engine and a control of a monitoring control unit which is processed in the work control unit shown in FIG. 1.

Therefore, as shown in FIG. 5, when the engine 11 is operated for a short period while the monitoring control unit 41 is deactivated on the intermittent work process (W1<W0), the normal work process is processed while the intermittent work process is suspended if the engine 11 is on state. If the engine 11 is off state afterward, the intermittent work process is restarted according to the accumulated time of the continued timer 42b, and the monitoring control unit 41 is deactivated again, and the intermittent work with 10 minute periods or 30 minute periods is not restarted.

In the same way, as shown in FIG. 5, the interrupt condition is met while the monitoring control unit 41 is intermittently activated in 30 minute periods on the intermittent work process, the intermittent work process is suspended and the interrupt work process is processed until the interrupt condition is removed. If the interrupt condition is removed afterward, with a condition that the continuous accumulated time Wn of the engine 11 falls below the threshold W0, the intermittent work process is restarted according to the accumulated time of the continued timer 42b, the monitoring control unit 41 is intermittently deactivated in 30 minute periods, and the intermittent work of 30 minute periods is not proceeded.

As a result, a situation that the power consumption of the battery 17 rapidly increases is prevented, and a shortening of the battery 17 by activating the monitoring control unit 41 is prevented.

On the other hand, the engine 11 is continuously operated for more than the threshold W0 while the monitoring control unit 41 is deactivated on the intermittent work process (W2>W0), that is, the battery 17 is charged to a predetermined charging state by working the engine 11, the timer 42b is cleared, and the following intermittent work process is proceeded from the construction machine 10 minute period intermittent work process. Therefore, monitoring of the construction machine 10 is enhanced while maintaining a restartability of the engine 11.

Meanwhile, in the embodiment above, the mobile object monitoring device 40 for monitoring the construction machine 10 with the working machine 12 is illustrated, however, the present invention is applicable to other mobile objects with the engine 11 as drive sources.

Also, in the embodiment above, the intermittent work schedule S3, in which the operation rate is reduced in a phased manner according to the accumulated time for on state of the engine 11 and the monitoring control means is eventually deactivated, is shown as a example of an intermittent work schedule. However, the intermittent work schedule is not limited to the intermittent work schedule S3 described in the embodiment, and the intermittent work schedule do not necessary stop the monitoring control unit. Meanwhile, the operating rate of the intermittent work is intended to change by three steps, but it is not restricted to three steps. For example, as an intermittent work schedule, the operating rate can be changed by two steps, or by even more than four steps. Furthermore, the operating rate is not necessarily changed by step by step, but the operating rate can be changed linearly based on the accumulated time of off state of the engine 11.

The invention claimed is:

1. A mobile object monitoring device, which is installed in a mobile object with an engine as a drive source, comprising:
   a monitoring control unit that collects information about the mobile object; and
   a work control unit that controls work of the monitoring control unit, wherein
   the work control unit activates the monitoring control unit according to an intermittent work schedule in which an operation rate is gradually decreased until a continuous working time of the engine exceeds a predetermined threshold after the engine becomes off state.

2. The mobile object monitoring device according to claim 1, wherein
the mobile object includes a battery which is charged when the engine is on state,
the work control unit controls the monitoring control unit with the threshold which is a time required to charge the battery to a certain charge level by driving the engine.

3. The mobile object monitoring device according to claim 1, wherein
the work control unit activates the monitoring control unit according to a high operation work schedule which has a higher operation rate than the intermittent work schedule if a predetermined intermittent condition is met.

4. The mobile object monitoring device according to claim 3, wherein
the monitoring control unit includes a function to collect positional information of the mobile object,
the work control unit activates the monitoring control unit according to the high operation work schedule when the work control unit determines that the intermittent condition is met if a traveling distance of the mobile object, which is computed using the positional information collected by the monitoring control unit, exceeds a predetermined reference distance.

5. The mobile object monitoring device according to claim 1, wherein
the work control unit activates the monitoring control unit according to a high operation work schedule which has a higher operation rate than the intermittent work schedule if the engine becomes on state during activation of the monitoring control unit according to the intermittent work schedule.

6. The mobile object monitoring device according to claim 3, wherein
in case that the high operation work schedule is prosecuted by sustaining the intermittent work schedule, the work control unit restarts thereafter activation of the monitoring control unit according to the intermittent work schedule if the continuous working time of the engine in the meantime does not exceed the threshold.

7. The mobile object monitoring device according to claim 1, wherein
the intermittent work schedule reduces the operation rate of the monitoring control unit in a phased manner according to an accumulated time for the engine in off state and eventually deactivates the monitoring control unit.

8. The mobile object monitoring device according to claim 1, wherein
the monitoring control unit includes a communication processing unit, which transmits the information about the mobile object to a management unit which administrates the mobile object if a predetermined transmission condition is met.

* * * * *